INVENTOR.
GLENN E. McFARLAND
BY
ATTORNEY

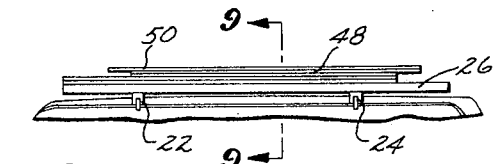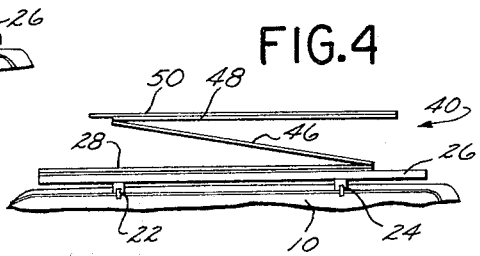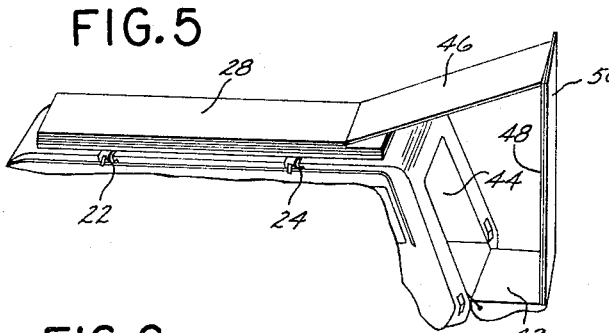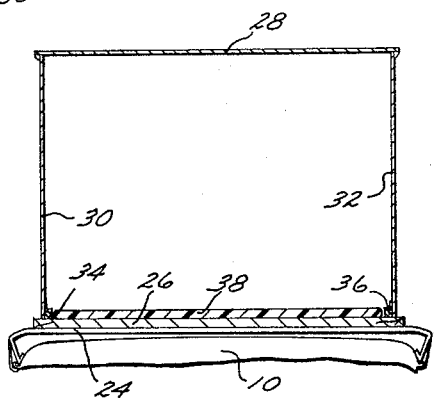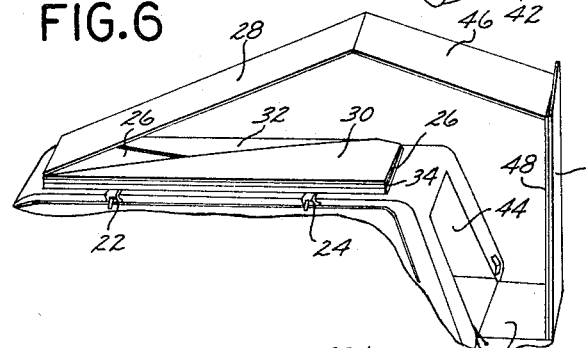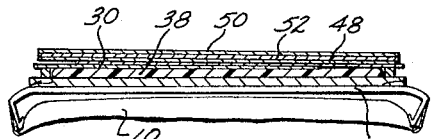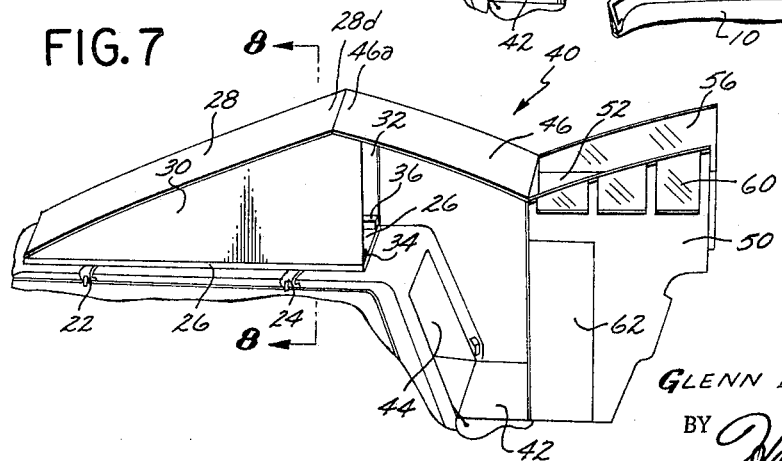

United States Patent Office 3,288,519
Patented Nov. 29, 1966

3,288,519
FOLDABLE ENCLOSURE FOR VEHICLES
Glenn E. McFarland, 6321 Ulysses St., Wichita, Kans.
Filed Dec. 10, 1964, Ser. No. 417,415
5 Claims. (Cl. 296—23)

The present invention relates generally to foldable enclosures for vehicles and more particularly to such devices for use as sleeping quarters on camping outings and the like.

Within the past several decades, the recreational activity of camping has become very popular, so much so, in fact, that today many families annually spend considerable time in the out-of-doors. As a consequence of such increased activities, the industries which supply equipment such as tents, stoves, trailers, and the like have enjoyed tremendous growth within the past years. Also, many new industries have come into being such as the vast trailer and camper manufacturing industry. Today many different types of trailers to be pulled by trucks and automobiles are very prominent on our nation's highways, and manufacturing plants for such equipment can be found in every corner of the country.

Several decades ago the only trailers available for camping and other recreational purposes were generally very small in size and extremely modest in the number and kinds of appliances and other facilities therewithin. Today, however, trailers are relatively large and contain appliances and facilities of practically every type and description.

One disadvantage of trailers, whether of the house trailer variety or of the type wherein camping equipment is stored and transported, is that the ease and speed of travel of the entire unit from one location to another is significantly reduced over the ease and speed of travel enjoyed by an ordinary passenger automobile. This factor is quite significant, particularly where a trip is being made across country or along a route where the points of interest are widely separated.

To overcome the aforementioned disadvantage, enclosures of various types have been devised to be carried by pickup trucks and the like. However, even such trucks are not easy to drive and maneuver for long periods of time, in spite of the fact that most such vehicles have power steering, power brakes and the other advantages of modern technology.

It has been realized that it would be highly advantageous to have a vehicle which could maintain the comforts, ease of operation and speed of travel of the modern-day passenger car, while nonetheless having sleeping quarters wherein a number of persons can comfortably sleep in the out-of-doors. It was also realized that in order to accomplish these objectives, an ordinary passenger automobile should be utilized, and enclosure means provided thereon which can keep out the elements and which will provide sufficient space for sleeping four persons.

Perhaps the most cumbersome requirement in meeting these needs was the necessity of having the enclosure completely collapsible so as to permit the vehicle to have all of its speed and operational advantages during ordinary driving, and which enclosure when set up would provide optimum privacy for the occupants or users thereof.

An object of the present invention is to provide a foldable enclosure which is adaptable to substantially any type of passenger automobile of the station wagon style to provide a sleeping enclosure for up to four persons.

Another object of the present invention is to provide a foldable enclosure as characterized above which is formed of relatively non-flexible construction materials which are impervious to rain, snow or substantially any other climate conditions.

Another object of the present invention is to provide a foldable enclosure as characterized above which is carried on an ordinary car top carrier of virtually any commercial design.

A further object of the present invention is to provide a foldable enclosure as characterized above which extends from the top of the station wagon type passenger vehicle to the tailgate thereof so as to provide a sleeping area on top of the vehicle and a larger area above the tailgate.

Another further object of the present invention is to provide a foldable enclosure as characterized above, all the elements or members of which are of rigid waterproof material of such size as to be compactly arranged on the car top carrier for purposes of storage and transportation.

An even further object of the present invention is to provide in a foldable enclosure as characterized above having suitable hinge means for enabling the various members to be pivoted with respect to each other so as to be foldable into compact juxtaposed relation on the car top carrier.

A still further object of the present invention is to provide a foldable enclosure as characterized above wherein there is provided a rear enclosure unit which is positioned on and supported by the tailgate of the station wagon passenger automobile to provide an enclosure which is relatively high and wherein persons can stand.

Another further object of the present invention is to provide a foldable enclosure as characterized above for use with and on passenger automobiles of the station wagon type which is simple and inexpensive to manufacture and which is rugged and dependable in operation.

The novel features which I consider characteristic of my invention are set forth with particularity in the appended claims. The device itself, however, both as to its organization and mode of operation, together with additional object and advantages thereof, will best be understood from the following description of specific embodiments when read in connection with the accompanying drawings, in which:

FIGURE 3 is a fragmentary side elevational view showing the subject enclosure in its folded condition;

FIGURE 4 is a fragmentary side elevational view similar to FIGURE 3, showing the enclosure in partially expanded or erected condition;

FIGURE 5 is a fragmentary perspective view showing the subject enclosure in a further condition of erection;

FIGURE 6 is a fragmentary perspective view showing a still further condition of erection of the enclosure;

FIGURE 7 is a fragmentary perspective view showing an even further condition of erection of the enclosure;

FIGURE 8 is a sectional view through the subject enclosure, and taken substantially along line 8—8 of FIGUER 7 of the drawings; and FIGURE 9 is a fragmentary sectional view through the compacted or folded enclosure, taken substantially along line 9—9 of FIGURE 3 of the drawings.

Like reference characters indicate corresponding parts throughout the several views of the drawings.

Figure 1:
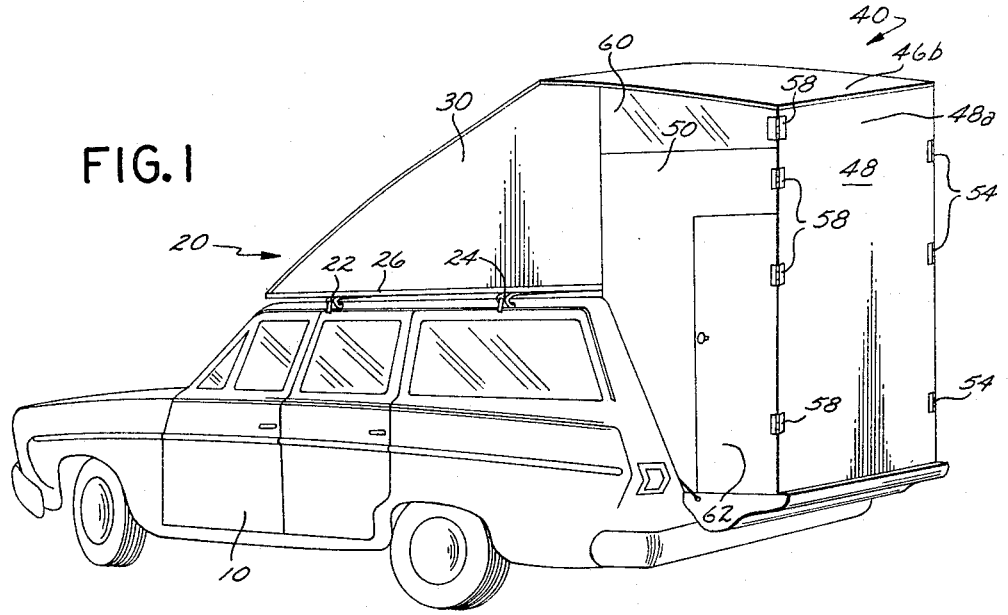
FIGURE 1 is a perspective view of the subject enclosure in erected condition on a station wagon automobile.

Referring to FIGURE 1 of the drawings, there is shown therein a passenger vehicle 10 of the style or type commonly referred to as a station wagon. Such vehicle is characterized by having a relatively long body or passenger compartment 12 which extends from the forward end of the vehicle, immediately to the rear of the engine compartment 14, to the rearward end 16. Such vehicle is thus built with a relatively large interior or passenger compartment, sufficient in length and width to contain sleeping equipment for two persons.

Although such type of passenger vehicle may have two or three sets of seats in spaced relation within the passenger compartment, only the forwardmost seat is not collapsible. Due to this arrangement, substantially every type of station wagon passenger vehicle can be quickly and easily converted into a vehicle having a relatively large cargo area or compartment.

Mounted on top of the vehicle 10 is a foldable enclosure 20 according to the present invention.

Any commercially available car top carriers, as shown at 22 and 24, may be provided on the top of the vehicle to afford means for mounting the enclosure 20. Such car top carriers afford rigid transverse mounting members of either steel, wood or plastic, to which any type of mounting member or container can be fastened.

Mounted on car top carriers 22 and 24 is a platform 26 of rigid, non-flexible construction material. It has been found preferable to have platform 26 formed of plywood approximately ¾ inch thick so that it will support the weight of several persons. In this regard, as will hereinafter become more apparent, the size of platform 26 must be such as to afford ample sleeping space for two persons. It is contemplated that sleeping bags, with or without air mattresses, may be used on the platform 26, or, as shown in FIGURE 9 of the drawings, a mattress of such width and length may be positioned thereon for providing the desired comfort for several persons.

Hingedly connected to the forward end 26a of platform 26 is an inclined top member 28 formed of plywood or any other appropriate construction material. The member 28, as will be readily apparent to those persons skilled in the art, need not be as thick or strong as platform 26. Suitable hinges (not shown) which connect forward end 28a of the top member 28 to the forward end 26a of platform 26 are so attached to these members as to enable top member 28 to be moved into parallel juxtaposed relation to platform 26 when the entire enclosure is folded as will hereinafter be explained in greater detail. Also, to prevent the ingress of rain, snow, and the like, it is preferable to locate such hinges as to cause the end portion 28a of the top member to extend over and beyond the end 26a of the platform. In this manner, whatever rain, snow or other foreign material accumulates on the top member, it will be caused to run off of the enclosure 20 by virtue of such overhang.

Due to the relative length and width of top member 28, it has been found preferable to provide such member with a generally arcuate shape providing a slightly concave surface 28b exposed downwardly while the upwardly exposed surface 28c is slightly convex. Such forming of member 28 compensates for its own weight as well as the weight of any snow or rain thereon.

Hingedly connected to the opposite sides of platform 26 are two generally triangular side members 30 and 32. Such side members are rotatable from vertically disposed positions as shown in FIGURES 1, 2, 7 and 8 to juxtaposed horizontal position when folded. To provide some additional rigidity to platform 26 throughout its length, to thereby more firmly support the side members 30 and 32, reinforcing members 34 and 36 may be provided as shown in FIGURE 7. Such reinforcing members extend the entire length of platform 26 along opposite edges thereof and in addition to strengthening the member 26 also provide a space therebetween for receiving a mattress or other cushioning means 39 as shown in FIGURE 9. The side members 30 and 32 may be hingedly connected to such reinforcing members 34 and 36 respectively, but they should overhang the platform 26 to prevent the ingress of water or other foreign materials.

Connected to the rearward edge 28d of top member 28 is a rear enclosure unit 40. Such unit is supported on the tailgate 42 of the station wagon vehicle and generally encloses the usual rear opening 44 of the station wagon.

Rear enclosure unit 40 comprises a rear top member 46 the forward edge 46a of which is hingedly connected to the rearward edge 28d of top member 28. Such rear top member 46 has its rearward edge 46b hingedly connected to the upper portion 48a of a rear wall 48. As shown most clearly in FIGURES 1 and 2 of the drawings, the rear wall 48 rests upon the tailgate 42 of the station wagon automobile to thereby provide support for the rear enclosure unit 40.

Figure 2:
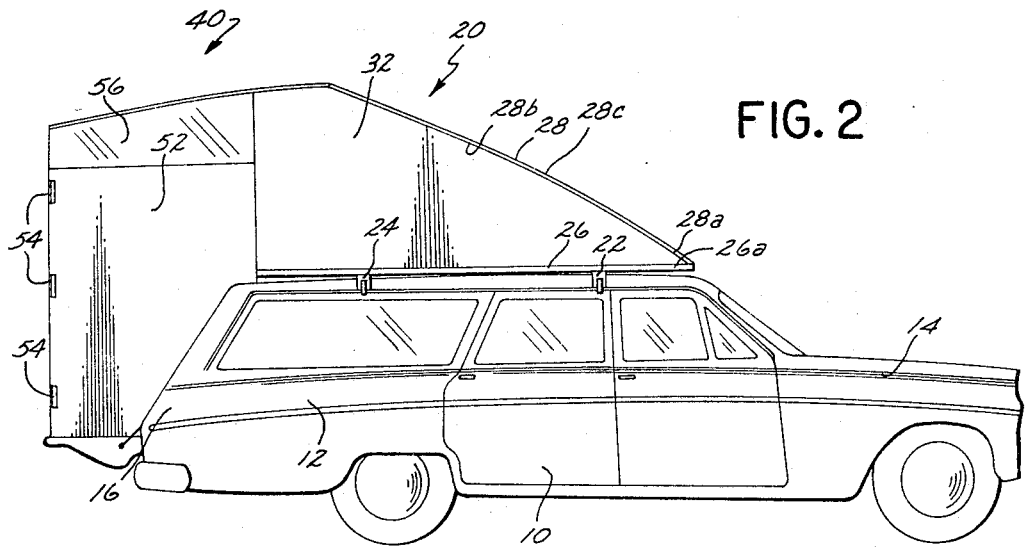
FIGURE 2 is a side elevational view of the erected enclosure and automobile of FIGURE 1.

As also shown most clearly in FIGURES 1 and 2, the rear top member 46 is preferably formed with an arcuate shape to support its own weight and the weight of foreign materials thereon.

Hingedly connected to the opposite side edges of rear wall 48 are side walls 50 and 52. Each such side wall extends along the side of the passenger or cargo compartment of the automobile in coplanar relation to the respective side members 30 and 32.

The side wall 52, which is hinged to rear wall 48 by hinges 54, may be provided with an opaque plastic section 56 for permitting daylight into the rear enclosure unit. The side wall 50 is hingedly connected to rear wall 48 by hinges 58 and also may include an opaque section 60. As shown most clearly in FIGURE 1 of the drawings, the side wall 50 may be provided with a door 62 to afford access to the entire enclosure. Such door 62 creates the need for four hinges 58, as opposed to the three hinges 54 for use in connecting side wall 52 to rear wall 48.

All of the members of the rear enclosure unit 40, namely rear top member 46, rear wall 48, and side walls 50 and 52, may be formed of any appropriate construction material such as plywood. Also, the rear top member 46 preferably should overhang the rear wall 48 and the side walls 50 and 52 to prevent the ingress of rain and the like. The side walls 50 and 52 should extend within the cargo or passenger compartment of the station wagon vehicle so as to provide optimum weather protection for the interior of the enclosure 20.

The enclosure 20 is shown in its folded or compact condition in FIGURE 3. While the vehicle is being used for transportation from one location to another, the entire foldable enclosure 20 is thus compactly arranged on the car top carriers 22 and 24.

The procedure for erecting the enclosure from such folded or compact condition will now be described, such method of erection also indicating the procedure for folding the enclosure into its condition as shown in FIGURES 3 and 9.

Referring to FIGURE 4 of the drawings, it is seen that the first step in erecting the enclosure 20 is to remove the various members which make up the rear enclosure unit 40. That is, the rear wall 48 is removed from its juxtaposed relation to rear top member 46, and carries with it the side walls 50 and 52.

As shown in FIGURE 5 of the drawings, the rear wall 48 is placed on the tailgate 42 of the automobile 10 in its proper generally vertical position. The tailgate 42, of course has been previously lowered into its horizontal position thereby exposing the rear opening 44 of the passenger or cargo compartment of the vehicle.

Such positioning of rear wall 48 causes rear top member 46 to be disposed as shown in FIGURE 5. Thereafter, the top member 28 and the rear top member 46 are urged upwardly thereby exposing the triangularly shaped side members 30 and 32 which are then in parallel relation on platform 26. Such side members 30 and 32 are then raised to their vertical positions about their hinged connections with platform 26.

As shown in FIGURE 7 of the drawings, when the side members 30 and 32 are thus placed in their vertical positions, the top member 28 is lowered to its proper inclined position resting along its opposite edges on the side members.

The rear side walls 50 and 52 are then rotated into positions adjacent the rear portion 12 of the automobile 10. Thereafter, the entire rear enclosure unit is lifted upwardly so as to pivot about the hinged connections at either end of rear top member 46 to thereby provide sufficient room for the side walls 50 and 52 to be pivoted into parallel relation of either side of rear top member 46. Thereafter, the entire rear enclosure unit 40 is inserted into the rear opening 44 of the vehicle 10, the entire foldable enclosure 20 thereby being assembled in operating position.

The door 62 of the enclosure can be used in a normal manner to permit persons or equipment to enter or leave the enclosure.

As shown most clearly in FIGURE 9 of the drawings, a mattress 38 or other comfortable support means may be permanently provided in the enclosure. As such, platform 26 constitutes a sleeping area for two persons. The cargo or passenger compartment of the station wagon vehicle 10, as readily understood by persons familiar with such vehicles, affords ample room for housing at least two other persons. It is contemplated within the scope of the present invention that the usual window areas of the vehicle can be provided with suitable shades or curtains to afford privacy for the persons within the vehicle.

It should be particularly noted that the rear enclosure unit 40 provides a private space wherein some adults and most children can stand to prepare for using the sleeping accommodations, both on top of the vehicle and therewithin.

It is thus seen that the present invention provides an enclosure which can be quickly and easily folded merely by reversing the above explained erection procedures.

Although I have shown and described certain specific embodiments of my invention, I am fully aware that many modifications thereof are possible. My invention, therefore is not to be restricted except insofar as is necessitated by the prior art and by the spirit of the appended claims.

I claim:
1. A foldable enclosure to be used with and carried by an automobile of station wagon style comprising in combination, a rigid platform secured to the top of the automobile, at least two rigid side members hingedly connected to said platform and individually movable from a vertical position to parallel relation with and on said platform, a rearwardly extending top member hingedly connected relative to the forward portion of said platform to parallel relation with and on said platform, and a rear enclosure unit to be supported on the tailgate of the station wagon comprising a rear top member hingedly connected to the rearward portion of said first-mentioned top member, a rear wall hingedly connected to said rear top member to be vertically positioned on the tail gate of said station wagon, and a pair of sidewalls hingedly connected to opposite sides of said rear wall to be vertically positioned on said tail gate on opposite sides of the rear opening to the passenger compartment of said station wagon, whereby said rear enclosure unit cooperates with said station wagon to provide an enclosure to the rear of said station wagon which cooperates with such side and top members to form a relatively large enclosure on top of and to the rear of said station wagon passenger compartment.

2. A foldable enclosure to be used with and carried by an automobile of station wagon style according to claim 1 wherein each of the rear top member, rear wall and side walls of said rear enclosure unit is formed of inflexible construction material.

3. A foldable enclosure to be used with and carried by an automobile of station wagon style according to claim 2 wherein hinges are employed to provide hinged connections between said members and said side walls whereby all of said members and walls can be arranged in juxtaposed relation on said platform for storage and transportation.

4. A foldable enclosure to be used with and carried by an automobile of station wagon style according to claim 1 wherein said rear top member is hingedly interposed between said first-mentioned top member and said rear wall whereby they can be arranged one on top of the other on said platform for compactness in storage and transportation.

5. A foldable enclosure to be used with and carried by an automobile of station wagon style according to claim 4 wherein said side walls of said rear enclosure unit are hingedly connected to the opposite sides of said rear wall, whereby said first mentioned top member, rear top member and rear wall can be arranged in juxtaposed relation on said platform with said opposite side walls successively positioned in parallel relation and on top of said rear wall.

References Cited by the Examiner

UNITED STATES PATENTS

| | | | |
|---|---|---|---|
| 1,984,681 | 12/1934 | Jackson | 135—5 |
| 2,188,545 | 1/1940 | Smelker | 296—26 |
| 3,021,852 | 2/1962 | Hoffman | 135—1 |
| 3,190,689 | 6/1965 | Calthorpe | 296—23 X |

BENJAMIN HERSH, *Primary Examiner.*

P. GOODMAN, *Assistant Examiner.*